(12) United States Patent
Kombowski et al.

(10) Patent No.: US 9,285,024 B2
(45) Date of Patent: Mar. 15, 2016

(54) TORQUE TRANSMISSION DEVICE

(75) Inventors: Eugen Kombowski, Buehl (DE); Dominique Engelmann, Offendorf (FR); Bruno Mueller, Sasbach (DE); Thorsten Krause, Buehl (DE); Ralf Stopp, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 752 days.

(21) Appl. No.: 12/697,819

(22) Filed: Feb. 1, 2010

(65) Prior Publication Data

US 2010/0193320 A1    Aug. 5, 2010

Related U.S. Application Data

(63) Continuation of application No. PCT/DE2008/001118, filed on Jul. 7, 2008.

(30) Foreign Application Priority Data

Aug. 2, 2007  (DE) .................. 10 2007 036 195

(51) Int. Cl.
*F16H 45/02* (2006.01)
*F16F 15/10* (2006.01)
*F16H 45/00* (2006.01)

(52) U.S. Cl.
CPC .......... *F16H 45/02* (2013.01); *F16H 2045/002* (2013.01); *F16H 2045/021* (2013.01); *F16H 2045/0226* (2013.01); *F16H 2045/0231* (2013.01); *F16H 2045/0252* (2013.01); *F16H 2045/0257* (2013.01); *F16H 2045/0284* (2013.01)

(58) Field of Classification Search
CPC .................. F16H 2045/002; F16H 2045/021; F16H 2045/0226; F16H 2045/0231; F16H 2045/0252
USPC ........................................... 60/341
See application file for complete search history.

(56) References Cited

U.S. PATENT DOCUMENTS

| 2,753,703 | A | * | 7/1956 | McIntyre | 464/23 |
| 3,105,371 | A | * | 10/1963 | Forrest | 464/46 |
| 3,820,417 | A | * | 6/1974 | Allen | 475/65 |
| 4,928,486 | A | * | 5/1990 | Despres | 60/338 |
| 5,020,646 | A | * | 6/1991 | Koshimo | 192/3.25 |
| 5,337,867 | A | * | 8/1994 | Kirkwood | 192/3.29 |
| 5,590,750 | A | * | 1/1997 | Graton et al. | 192/3.29 |
| 5,685,404 | A | * | 11/1997 | Fukushima | 192/3.26 |
| 5,762,172 | A | * | 6/1998 | Tsukamoto et al. | 192/3.29 |
| 5,769,195 | A | * | 6/1998 | Fukushima | 192/3.29 |

(Continued)

FOREIGN PATENT DOCUMENTS

| DE | 19826351 A1 | 12/1999 |
| DE | 10314325 A1 | 10/2004 |

(Continued)

*Primary Examiner* — Robert Hodge
*Assistant Examiner* — Terry Chau
(74) *Attorney, Agent, or Firm* — Simpson & Simpson, PLLC

(57) ABSTRACT

A torque transmission device comprising a torque converter disposed in a drive train of a motor vehicle, in particular a hydrodynamic torque converter or a fluid clutch, wherein the converter or the fluid clutch comprises a turbine shell and a pump shell which can be coupled through a pump clutch and at least one pump damper with a converter cover, and comprising at least one converter damper and at least one converter lock up clutch.

13 Claims, 13 Drawing Sheets

(56) References Cited

U.S. PATENT DOCUMENTS

| | | | | |
|---|---|---|---|---|
| 6,112,869 | A | * | 9/2000 | Krause et al. ................ 192/3.29 |
| 6,494,303 | B1 | * | 12/2002 | Reik et al. ................... 192/3.29 |
| 6,991,078 | B2 | * | 1/2006 | Leber .......................... 192/3.27 |
| 8,240,441 | B2 | * | 8/2012 | Heeke .......................... 192/3.25 |
| 2004/0188208 | A1 | * | 9/2004 | Leber .......................... 192/3.25 |
| 2007/0074943 | A1 | | 4/2007 | Hemphill et al. |
| 2007/0287581 | A1 | * | 12/2007 | Parks et al. .................... 477/52 |
| 2008/0023287 | A1 | * | 1/2008 | Thiede et al. ................ 192/48.1 |
| 2008/0060859 | A1 | * | 3/2008 | Klemen et al. ............... 180/65.3 |
| 2008/0149441 | A1 | * | 6/2008 | Sturgin ........................ 192/3.25 |
| 2008/0149442 | A1 | * | 6/2008 | Sturgin ........................ 192/3.26 |
| 2008/0156608 | A1 | * | 7/2008 | Kombowski ................ 192/48.1 |

FOREIGN PATENT DOCUMENTS

| | | |
|---|---|---|
| DE | 102006056742 A1 | 6/2007 |
| DE | 102007053971 A1 | 6/2008 |

\* cited by examiner

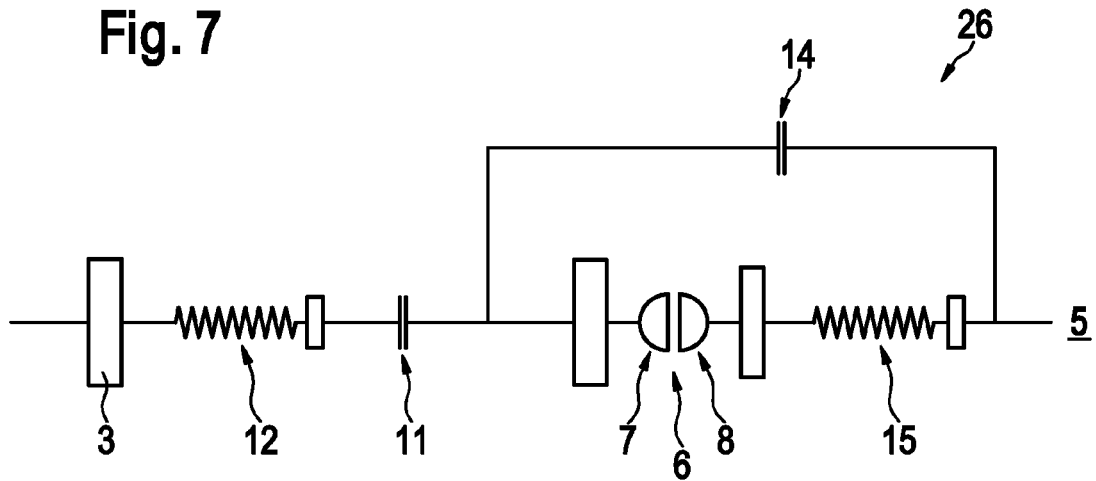
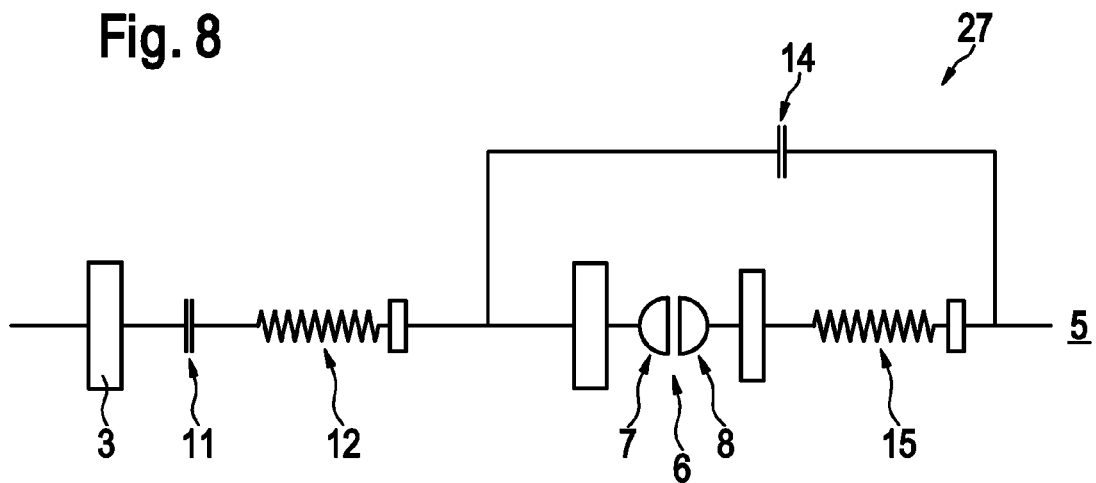
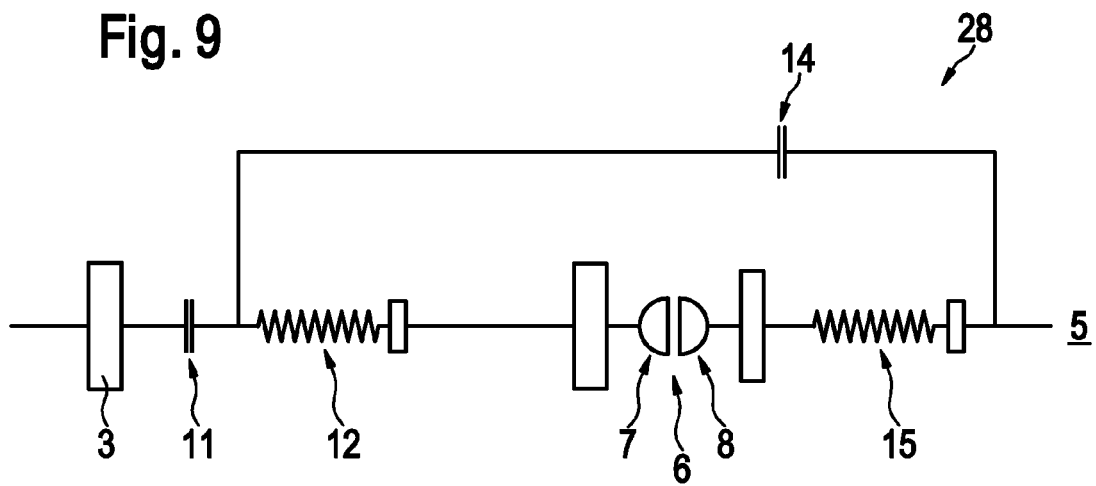

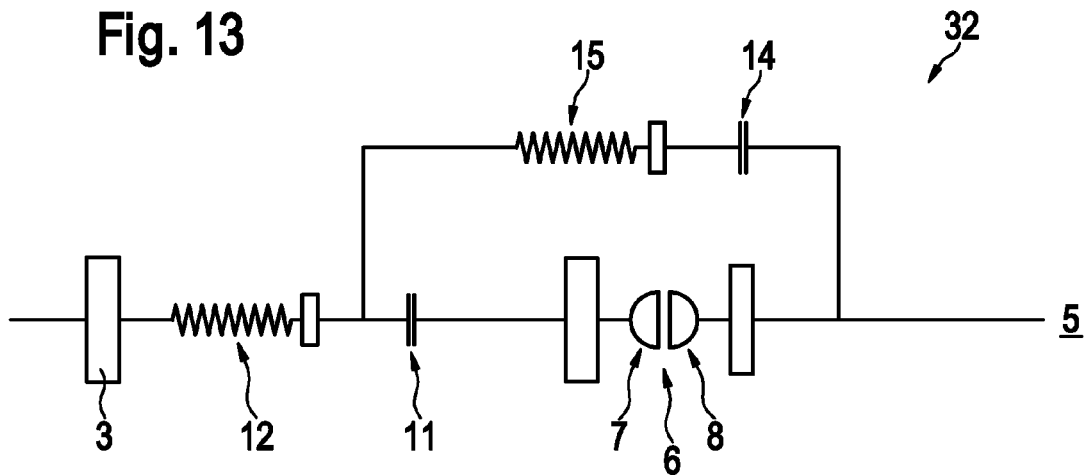
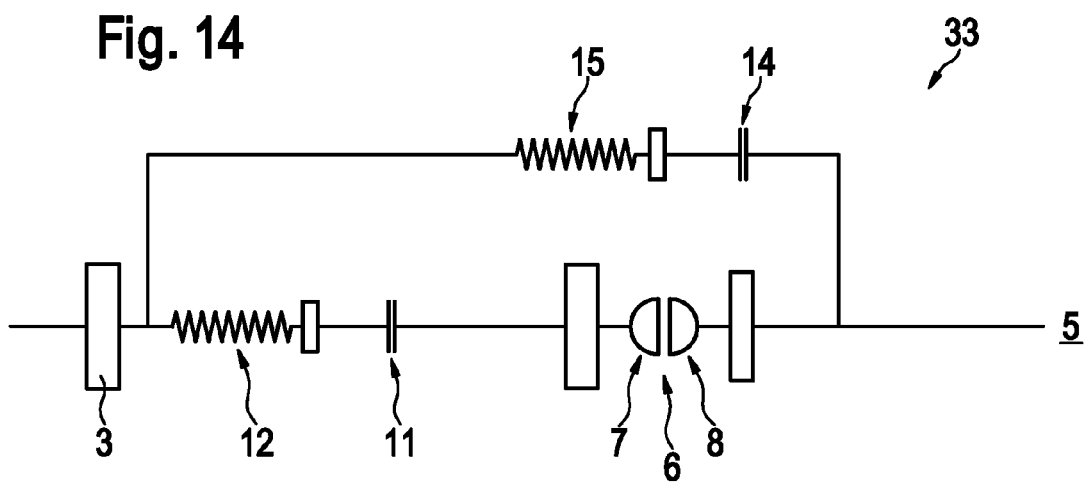
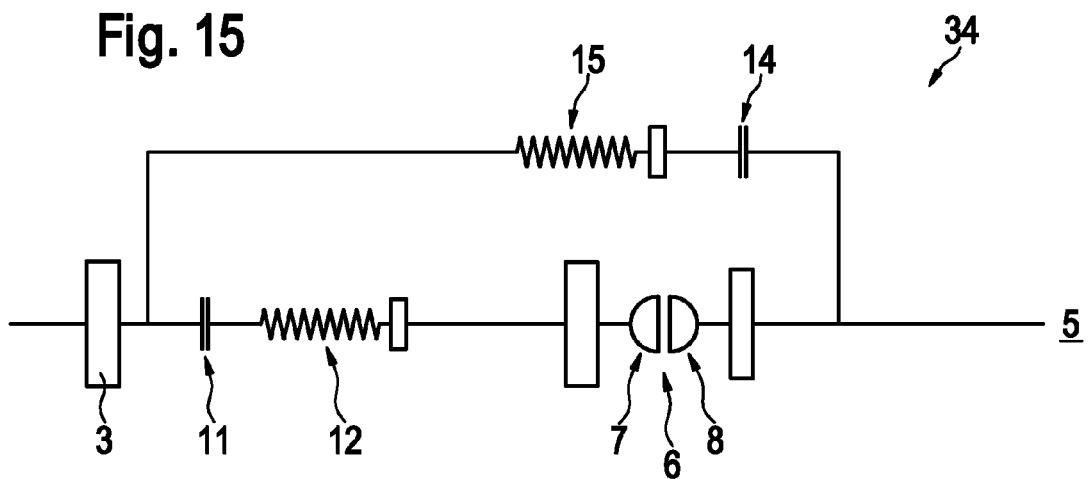

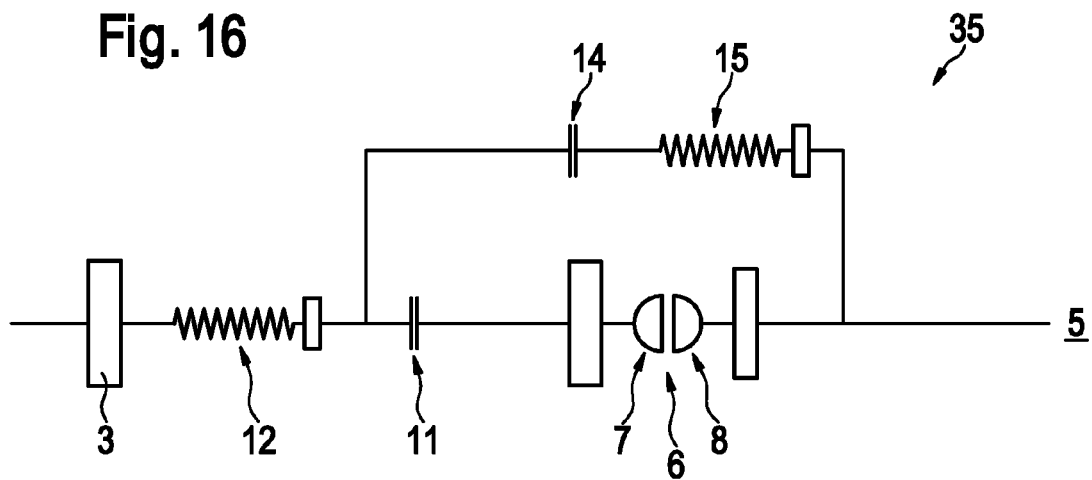
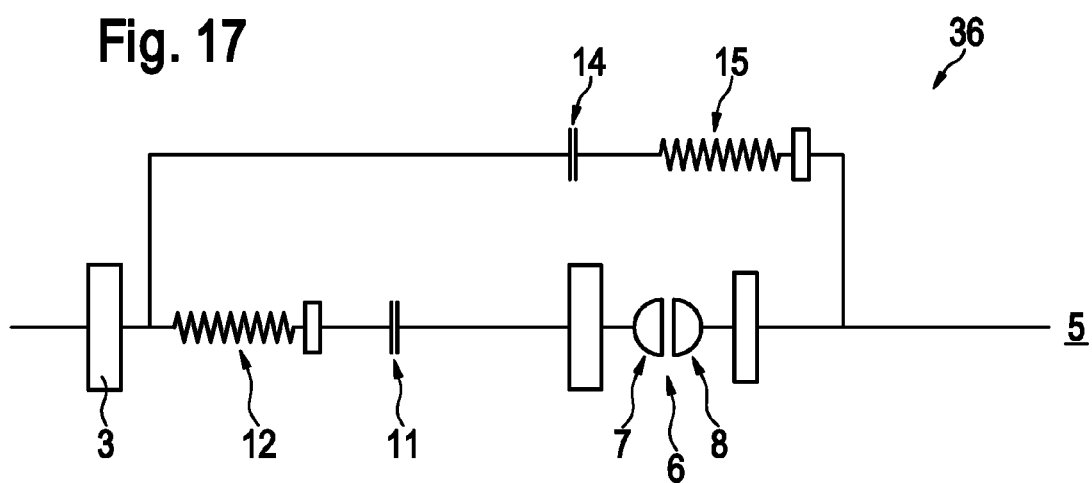
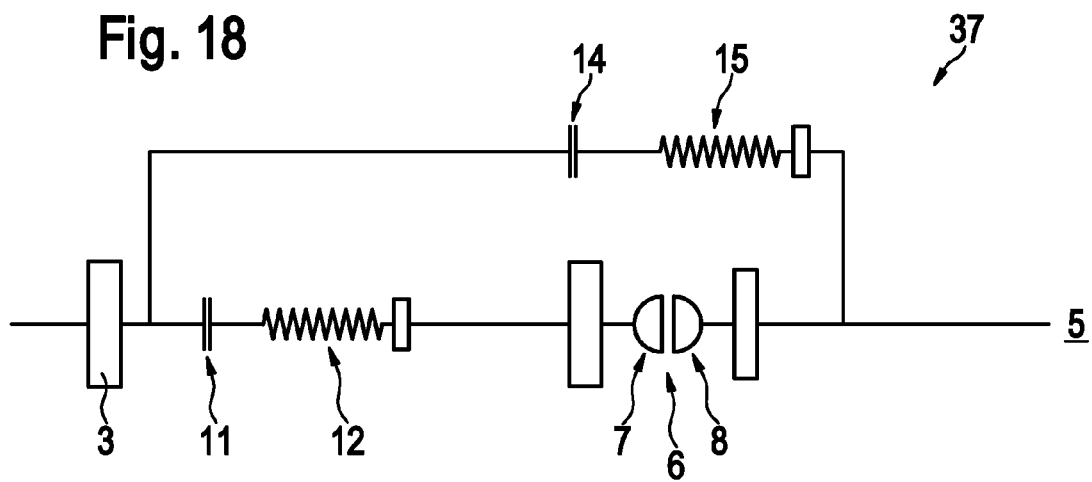

TORQUE TRANSMISSION DEVICE

CROSS-REFERENCE TO RELATED APPLICATIONS

This application is filed under 35 U.S.C. §120 and §365(c) as a continuation of International Patent Application PCT/DE2008/001118, filed Jul. 7, 2008, which application claims priority from German Patent Application No. DE 10 2007 036 195.7, filed on Aug. 2, 2007, which applications are incorporated herein by reference in their entireties.

FIELD OF THE INVENTION

The invention relates to a torque transmission device with a torque converter disposed in a drive train of a motor vehicle.

BACKGROUND OF THE INVENTION

Various multi function torque converters with a damper are known in the prior art.

BRIEF SUMMARY OF THE INVENTION

It is the object of the invention to provide a torque transmission device with improved damping properties.

This object is accomplished through a torque transmission device with a torque converter disposed in the drive train of a motor vehicle, in particular a hydro dynamic torque converter or a fluid clutch, which torque converter includes a turbine shell and a pump shell which can be coupled through a pump clutch and at least one pump damper with a converter cover and including at least one converter damper and one converter lock up clutch. The pump clutch is used for coupling the pump shell, which is normally fixated to the converter cover, to the converter cover in an actuatable manner. A multi functional converter with good damping properties is provided through the pump damper associated with the pump clutch and the converter damper associated with the converter lock up clutch. The dampers can be provided e.g. as compression spring dampers or as an arc spring dampers. The disposition or connection of the clutches and dampers with the components of the torque converter can be provided in various ways. One of the dampers or both dampers can operate with the converter lock up clutch closed and/or open, which provides a series-, twin-, torsion- and/or turbine torsion damper feature. The two clutches can be connected in parallel or in series. Connecting the clutches in parallel may facilitate adjusting a different mass distribution of the dual mass converter/dual mass fly wheel during operation through opening the pump clutch with the converter lock up clutch closed.

A preferred embodiment of the torque transmission device is characterized in that the pump clutch can be connected in series with the pump damper or in that it is connected in series with the pump damper. This can be a direct series connection. However, also at least one additional element can be connectable or connected between the pump clutch and the pump damper.

Additional preferred embodiments of the torque transmission device are characterized in that the pump damper is connected in front or after the pump clutch.

Another preferred embodiment of the torque transmission device is characterized in that the pump damper can be connected or is connected between the converter cover and the pump clutch. Preferably, the converter cover is connected torque proof with a crank shaft of a combustion engine, e.g. through bolted connections.

Another preferred embodiment of the torque transmission device is characterized in that the pump clutch can be connected or is connected between the converter cover and the converter damper. Preferably the pump clutch is connected in front of the pump damper.

Another preferred embodiment of the torque transmission device is characterized in that the pump clutch is connectable or connected in parallel with the pump damper. The pump clutch and the converter lock up clutch can also preferably be connected in parallel or are connected in parallel.

Another preferred embodiment of the torque transmission device is characterized in that the pump damper can be connected or is connected in parallel with the torque converter and/or the converter damper.

Another preferred embodiment of the torque transmission device is characterized in that the converter lock up clutch can be connected in series with converter damper or is connected in series with the converter damper.

Other preferred embodiments of the torque transmission device are characterized in that the converter damper is connected in front or after the converter lock up clutch.

Another preferred embodiment of the torque transmission device is characterized in that the converter lock up clutch can be connected in parallel with the converter damper, or in that it is connected in parallel with the converter damper.

Another preferred embodiment of the torque transmission device is characterized in that the converter damper can be connected in series with the pump damper or is connected in series with the pump damper.

Another preferred embodiment of the torque transmission device is characterized in that the torque converter can be connected or is connected between the pump damper and the converter damper.

Another preferred embodiment of the torque transmission device is characterized in that the converter damper can be connected or is connected in parallel with the pump damper.

Another preferred embodiment of the torque transmission device is characterized in that the converter lock up clutch can be connected or is connected in parallel with the pump damper and/or the converter damper.

Another preferred embodiment of the torque transmission device is characterized in that the pump shell and the turbine shell can be connected or are connected in series with the pump damper and/or the pump clutch.

Another preferred embodiment of the torque transmission device is characterized in that the pump shell and the turbine shell can be connected or are connected in parallel with the converter damper and/or the converter lock up clutch.

Another preferred embodiment of the torque transmission device is characterized in that the pump clutch and the converter lock up clutch can be connected in series or are connected in series.

Another preferred embodiment of the torque transmission device is characterized in that the pump clutch and the converter lock up clutch can be connected in parallel or are connected in parallel.

Another preferred embodiment of the torque transmission device is characterized in that the torque converter can be connected or is connected in series between the pump damper and the converter damper.

Another preferred embodiment of the torque transmission device is characterized in that the converter lock up clutch and/or the converter damper can be connected or are connected in series with the pump damper.

Another preferred embodiment of the torque transmission device is characterized in that the converter lockup clutch can be connected or is connected between the pump damper and the converter damper.

Another preferred embodiment of the torque transmission device is characterized in that the converter damper can be connected or is connected between the pump damper and the converter lock up clutch.

Another preferred embodiment of the torque transmission device is characterized in that the pump damper, the converter lock up clutch and the converter damper can be connected or are connected in parallel with the torque converter.

According to an essential feature of the invention a multi function torque converter with two dampers is provided, wherein one damper is used for implementing the dual mass fly wheel characteristic/the dual mass converter characteristic and the second damper performs the function of a turbine torsion damper among other functions. Thus, various arrangements of the two dampers are provided in the force flow between the other components of the multi functional converter so that different mass distributions (primary, secondary) are achieved which leads to different dual mass converter properties/dual mass fly wheel properties. Thus, one of the dampers or both dampers can operated with the converter lockup clutch closed or open, wherein series-, twin-, torsion- and/or turbine torsion damper properties can be achieved. The two clutches can be connected in parallel or in series with one another.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIGS. 1-32 illustrate various feasible arrangements of the particular components with reference to various force flow diagrams;

DETAILED DESCRIPTION OF THE INVENTION

Figure 1:
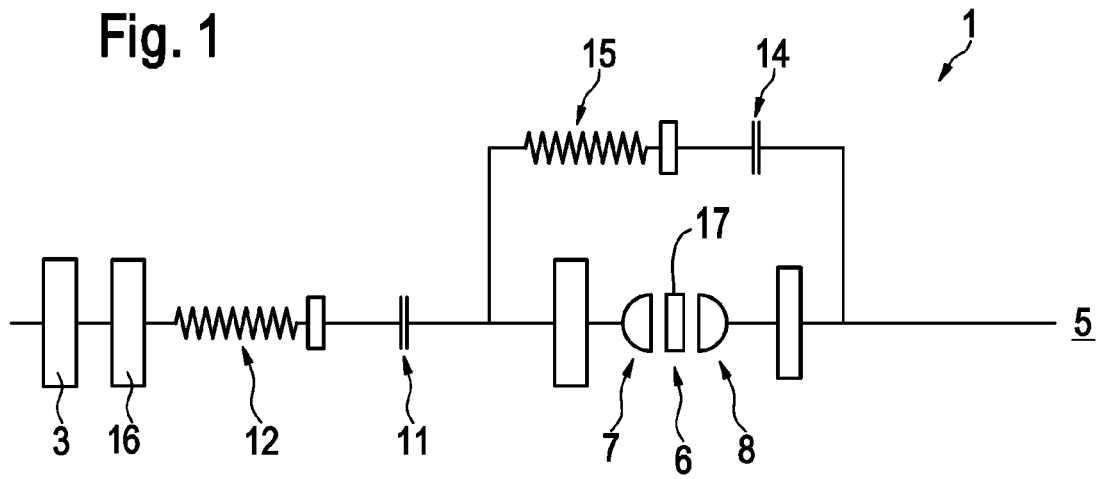

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

One respective drive train, 1, 21 through 51 is illustrated in a simplified schematic in the FIGS. 1 through 32. The particular components of the drive train are respectively provided with the same reference numerals. A torque converter 6 with cover 16 is disposed between a drive unit 3, in particular a combustion engine, from which a crank shaft extends, and a transmission 5. The torque converter 6 is e.g. a fluid clutch with a pump or a pump shell 7 and a turbine or a turbine shell 8. Torque converter 6 includes stator shell 17. The torque converter 6 can also be a hydrodynamic torque converter, which additionally includes and stator shell.

A pump clutch 11 and a pump damper 12 are associated with the pump shell 7. The torque converter 6 can be locked up through an integrated converter lock up clutch 14 which is associated with a converter damper 15. It is the function of the stator shell to deflect the fluid which flows out of the turbine shell during operation, so that it is fed back to the pump shell with optimum flow direction. This deflection increases the torque at the turbine shell.

Each of the force flow diagrams illustrated in FIGS. 1-32 depicts a possible embodiment of the multi function converter according to the invention with different damping properties. Several configurations are feasible for each of the illustrated force flow diagrams. By varying the 3 dimensional positions of both clutches and of both dampers within the converter relative to one another, the same force flow can be implemented through partially highly varied configurations.

Figure 2:
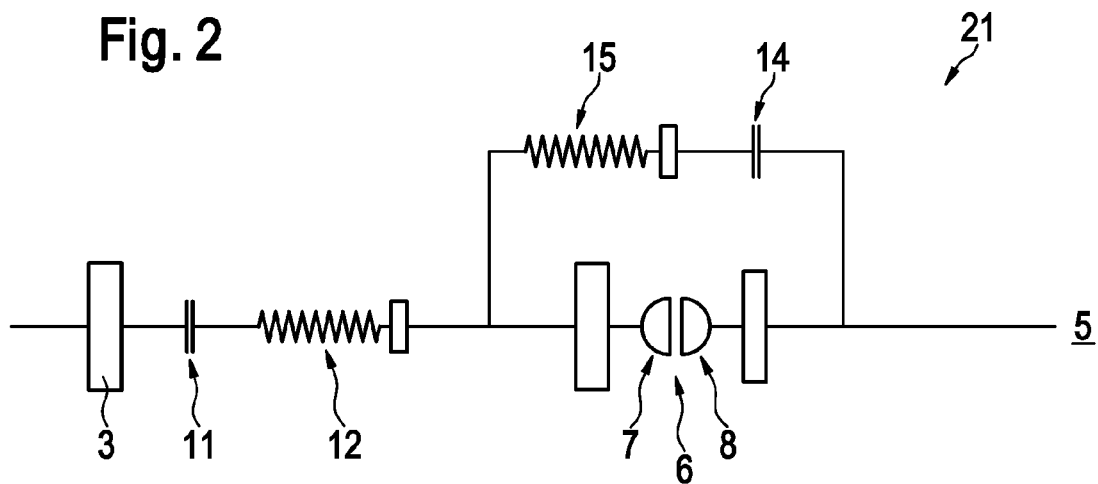

FIG. 1 illustrates an embodiment in which the pump clutch 11 is connected in series with the converter lockup clutch 14. The pump damper 12 is positioned in force flow direction in front of the pump clutch 11, this means between the drive unit 3 and the pump clutch 11. The converter damper 15 is also connected in the force flow in front of the converter lockup clutch 14. The series connection with the converter damper 15 and the converter lockup clutch 14 is connected in parallel with the torque converter 6, the pump shell 7 and the turbine shell 8. FIG. 2 illustrates an embodiment in which, differently from the preceding embodiment, the pump damper 12 is disposed in the force flow after the pump clutch 11. Otherwise there is no difference relative to the embodiments illustrated in FIG. 1.

Figure 3:
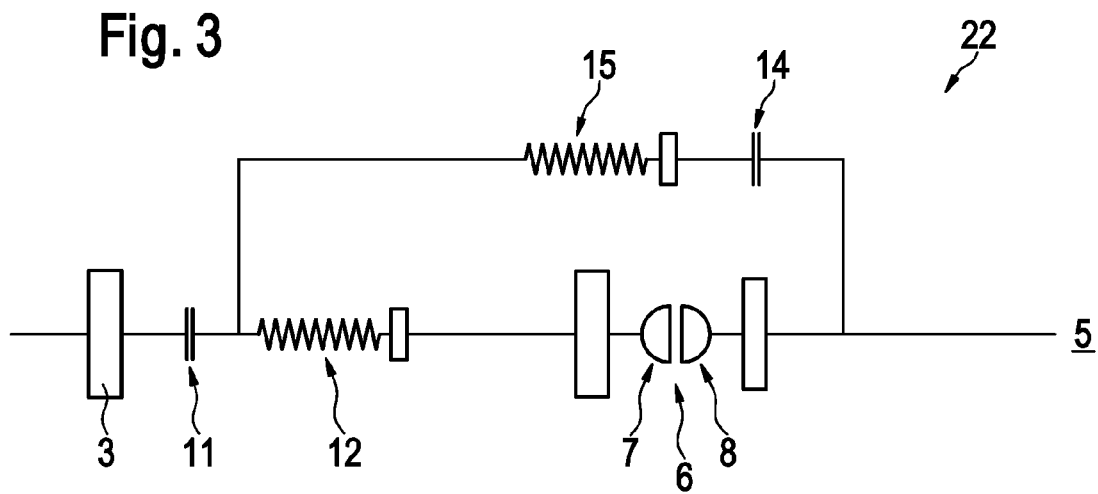

In the embodiment illustrated in FIG. 3 the series connection of the converter damper 15 and the converter lock up clutch 14 is connected in parallel with a series connection of the pump damper 12 and the torque converter 6. This has the effect that the pump damper 12 is also locked up when the converter lock up clutch 14 is closed. The pump clutch 11 is connected between the two series connections 15, 14 and 12, 6. The converter damper 15 is connected in front of the converter lockup clutch 14.

Figure 4:
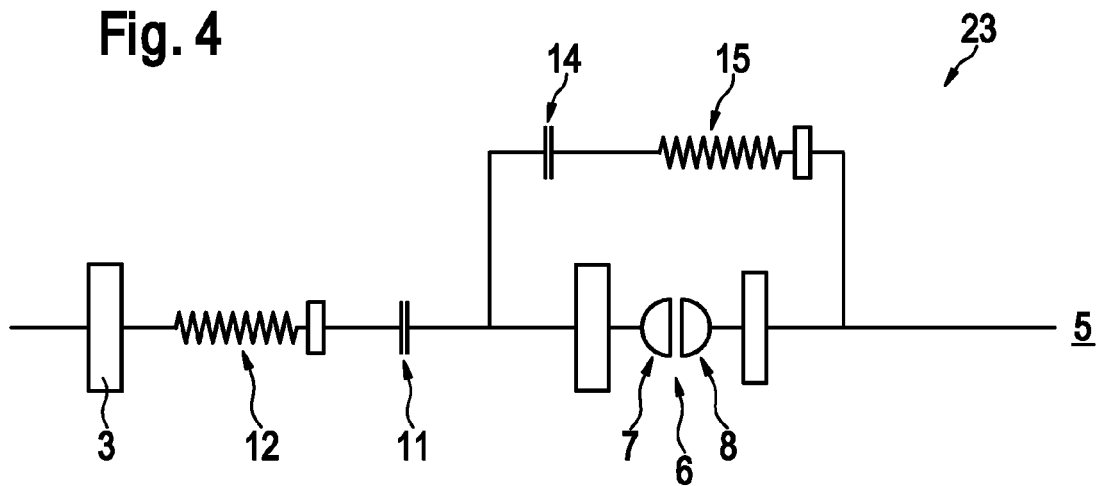

The embodiment illustrated in FIG. 4 is similar to the embodiment illustrated in FIG. 1, however, the converter damper 15 is disposed in the force flow behind the converter lockup clutch 14 for the embodiment illustrated in FIG. 4.

Figure 5:
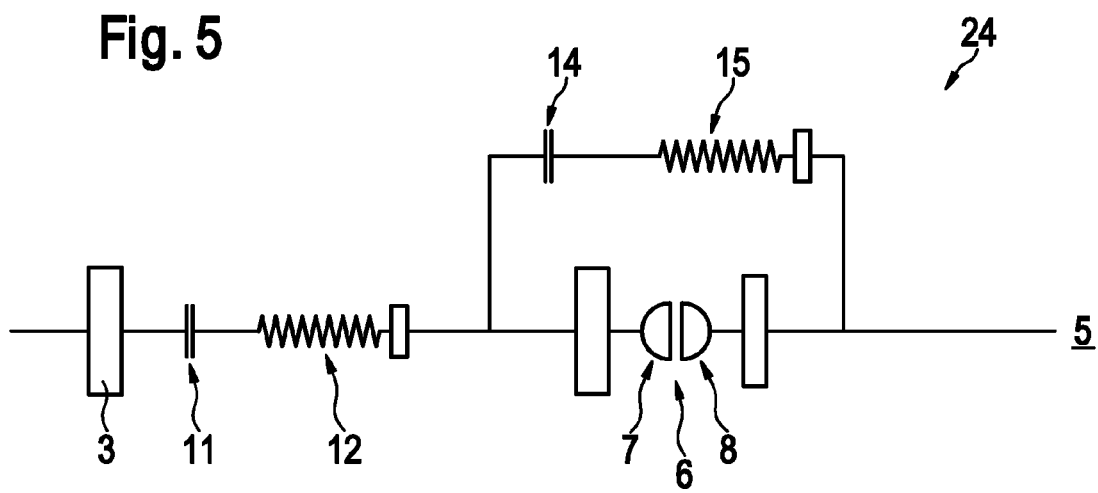

The embodiment illustrated in FIG. 5 is similar to the embodiment in FIG. 4. However, the pump clutch 11 is connected between the drive unit 3 and the pump damper 12 in the embodiment illustrated in FIG. 5.

Figure 6:
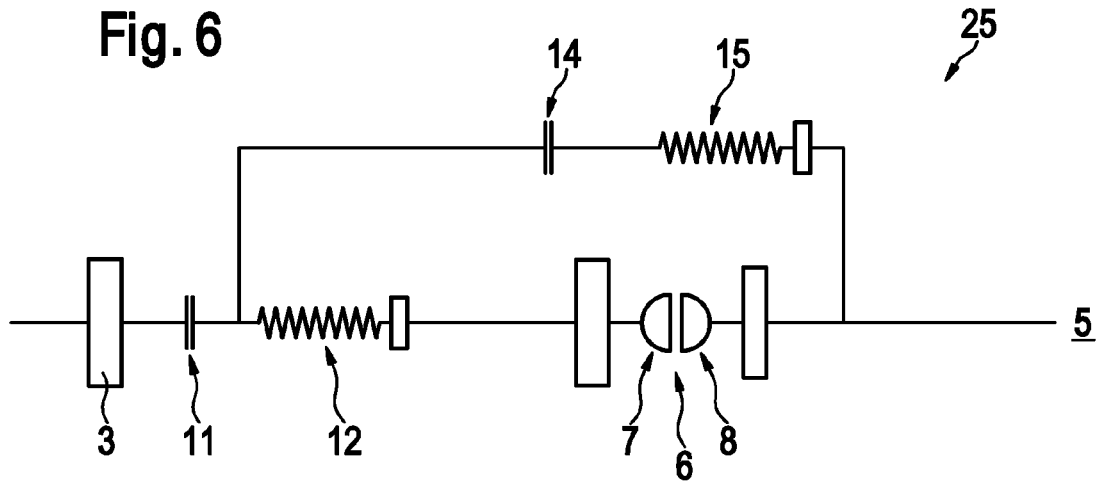

The embodiment illustrated in FIG. 6 is similar to the embodiment illustrated in FIG. 3. However, for the embodiment illustrated in FIG. 6, the converter damper 15 is connected after the converter lockup clutch 14.

For the embodiment illustrated in FIG. 7 the pump clutch 12 is connected in series between the drive unit 3 and the pump clutch 11. Furthermore, the torque converter 6 and the converter damper 15 are connected in series, wherein the converter damper 15 is connected after the torque converter 6. The series connection 6, 15 can be bridged by the converter lockup clutch 14 which is connected in parallel thereto.

The embodiment illustrated in FIG. 8 is similar to the embodiment illustrated in FIG. 7. However, for the embodiments illustrated in FIG. 8, the pump clutch 11 is connected in series between the drive unit 3 and the pump damper 12.

For the embodiment illustrated in FIG. 9, the torque converter 6 is connected in series between the pump damper 12 and the converter damper 15. Thus, the pump damper 12 is connected in the force flow in front of the torque converter 6. The series connection 12, 6, 15 can be bridged by the converter lockup clutch 14 connected parallel thereto. The pump clutch 11 is connected in front of this parallel connection, which pump clutch in turn is connected after the drive unit 3. For the variant illustrated in FIG. 9, both dampers 12, 15 are jointly locked up by the converter lock up clutch.

Figure 10:
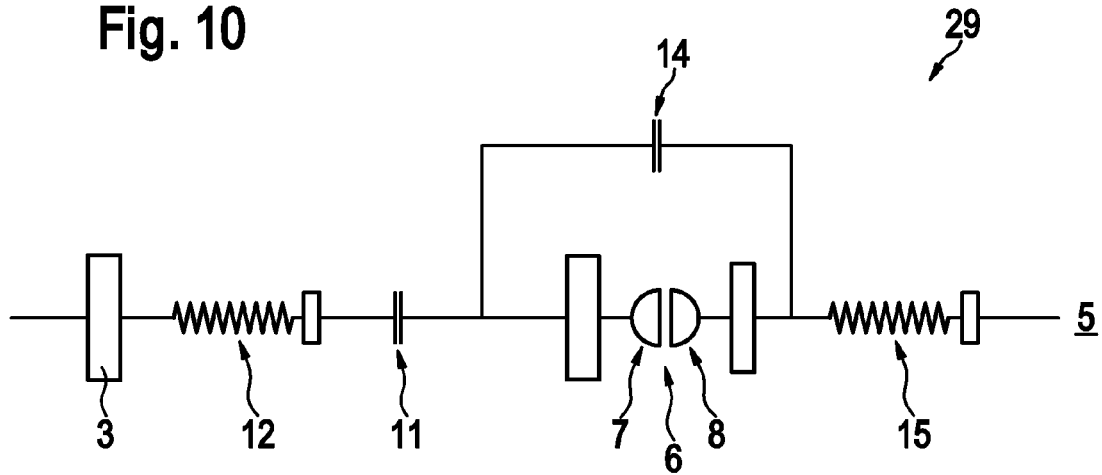

FIG. 10 illustrates an embodiment in which, differently from the preceding embodiments, none of the dampers 12, 15 is locked up by the converter lockup clutch 14. For the embodiment illustrated in FIG. 10, the converter lockup clutch 14 is connected in parallel with the torque converter 6. The pump clutch 11 and the pump damper 12 are connected in front of the parallel connection 6, 14. Thus the pump damper 12 is connected in series between the drive unit 3 and the pump clutch 11. The converter damper 15 is connected after the parallel connection 6, 14.

Figure 11:
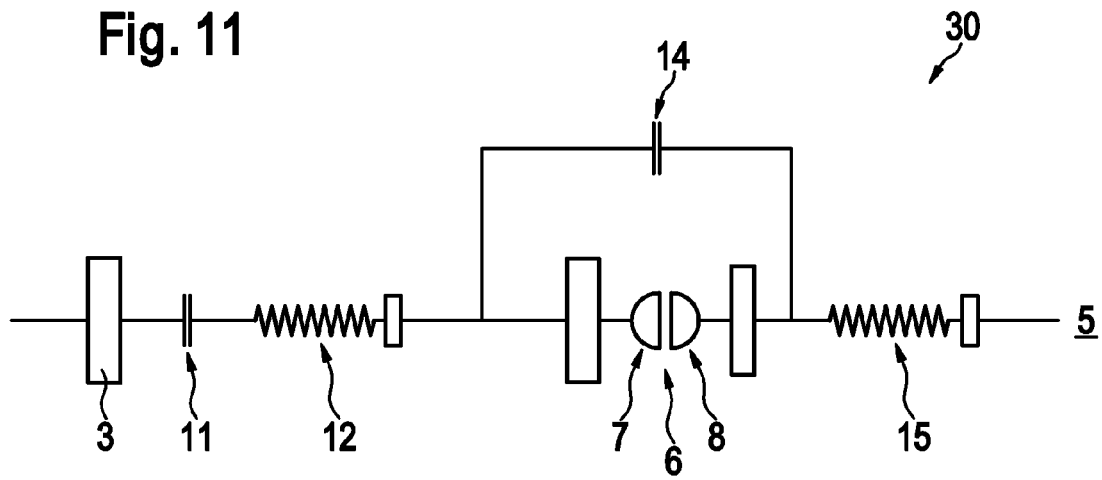

The embodiment illustrated in FIG. 11 is similar to the embodiment illustrated in FIG. 10. However, for the embodiments illustrated in FIG. 11 the pump clutch is connected between the drive unit 3 and the pump damper 12.

Figure 12:
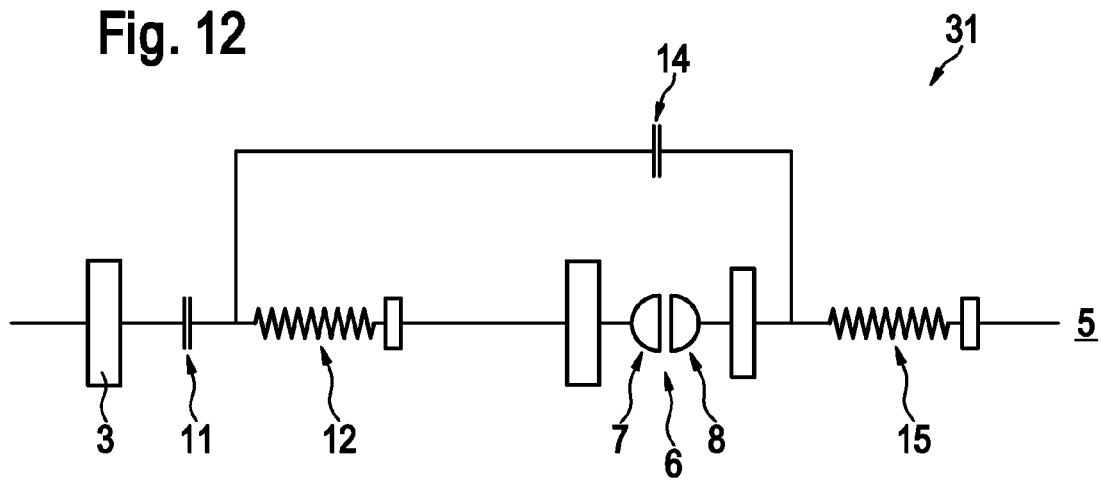

For the embodiment illustrated in FIG. 12, the pump damper 12 and the torque converter 6 are connected in series. The series connection 12, 6 is connected in parallel with the converter lockup clutch 14. The pump clutch 11 is connected in front of this parallel connection. The converter damper 15 is connected after this parallel connection.

For the embodiment illustrated in FIG. 13, the pump clutch 11 is connected in series with the torque converter 6, wherein the pump clutch 11 is connected in the force flow in front of the torque converter 6. A series connection of the converter damper 15 and the converter lockup clutch 14 is connected in parallel with the series connection 11, 6. The pump damper 12 is connected in front of this parallel connection, which pump damper is in turn in connected after the drive unit 3.

For the embodiments illustrated in FIG. 14, the pump damper 12, the pump clutch 11 and the torque converter 6 are connected in series. In another series connection the converter damper 15 and the converter lockup clutch 14 are connected in series. The series connection 15, 14 is performed in parallel to the series connection 12, 11, 6. This parallel connection in turn is connected after the drive unit 3.

The embodiment illustrated in FIG. 15 is similar to the embodiment illustrated in FIG. 14, however, the pump damper 12 is connected after the pump clutch 11 for the embodiments illustrated in FIG. 15. For the embodiment illustrated in FIG. 14 the pump damper 12 is connected in front of the pump clutch 11. Otherwise the two embodiments are identical.

The embodiment illustrated in FIG. 16 is similar to the embodiment illustrated in FIG. 13. However, the converter lockup clutch 14 is connected in front of the converter damper 15 for the embodiment illustrated in FIG. 16. For the embodiment illustrated in FIG. 13, the converter lockup clutch 14 is connected after the converter damper 15. Otherwise, the two embodiments are identical.

The embodiment illustrated in FIG. 17 is similar to the embodiment illustrated in FIG. 14. However for the embodiment illustrated in FIG. 17 the converter lockup clutch 14 is connected in front of the converter damper 15. For the embodiment illustrated in FIG. 14 the converter lockup clutch 14 is connected after the converter damper 15. Otherwise the two embodiments are identical.

The embodiment illustrated in FIG. 18 is similar to the embodiment illustrated in FIG. 17. However, for the embodiment illustrated in FIG. 18 the pump clutch 11 is connected in front of the pump damper 12. For the embodiment illustrated in FIG. 17, the pump clutch 11 is connected after the pump damper 12. Otherwise the two embodiments are identical.

Figure 19:
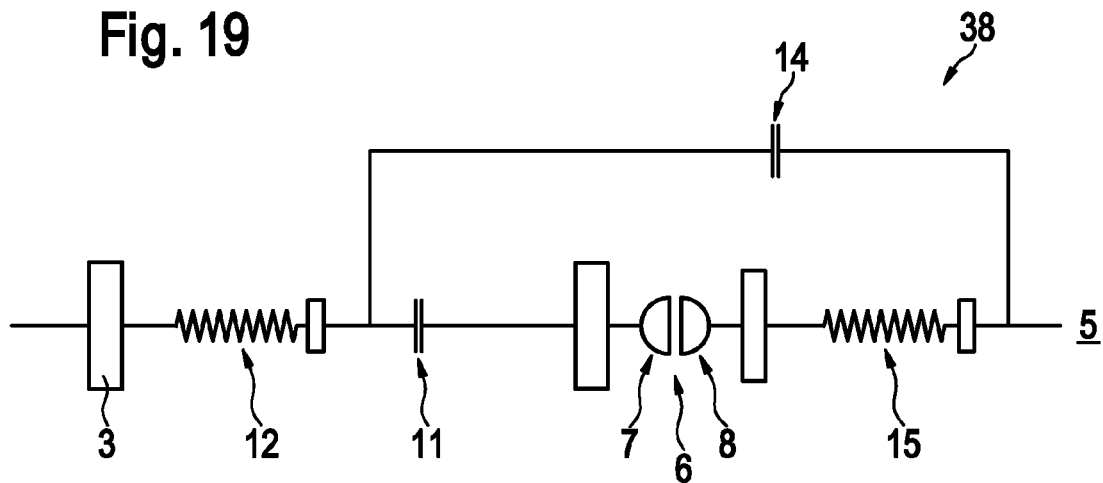

For the embodiment illustrated in FIG. 19 the pump clutch 11, the torque converter 6 and the converter damper 15 are connected in series. Thus, the pump clutch 11 is connected in the force flow in front of the torque converter 6. The torque converter 6 is connected in the force flow between the pump clutch 11 and the converter damper 15. The converter lockup clutch 14 is connected in parallel with the series connection 11, 6, 15. The pump damper 12 is connected in front of this parallel connection, which pump damper is connected in turn after the drive unit 3.

Figure 20:
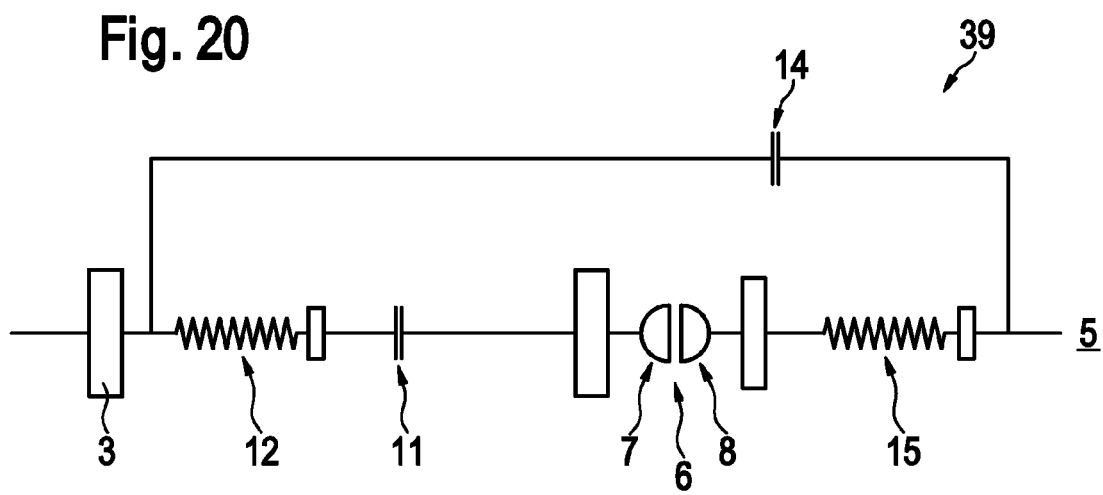

For the embodiment illustrated in FIG. 20 the pump damper 12, the pump clutch 11, the torque converter 6 and the converter damper 15 are connected in the force flow subsequent to one another. The converter lockup clutch 15 is connected in parallel with the series connection 12, 11, 6, 15. The drive unit 3 is connected in front of this parallel connection.

Figure 21:
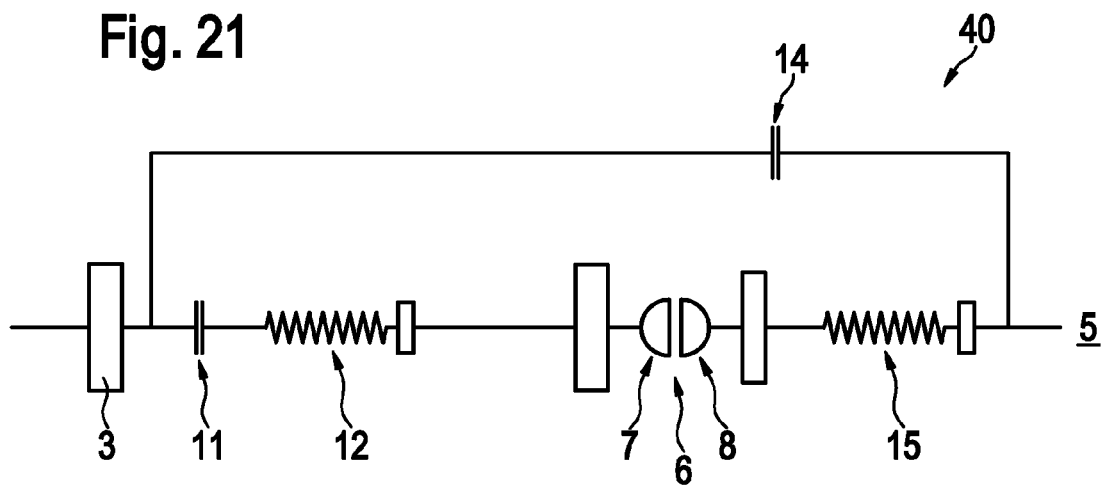

The embodiment illustrated in FIG. 21 is similar to the embodiment illustrated in FIG. 20. However, for the embodiment illustrated in FIG. 21 the pump clutch 11 is connected in front of the pump damper 12. For the embodiment illustrated in FIG. 20, the pump clutch 11 is connected subsequent to the pump damper 12. Otherwise the two embodiments are identical.

Figure 22:
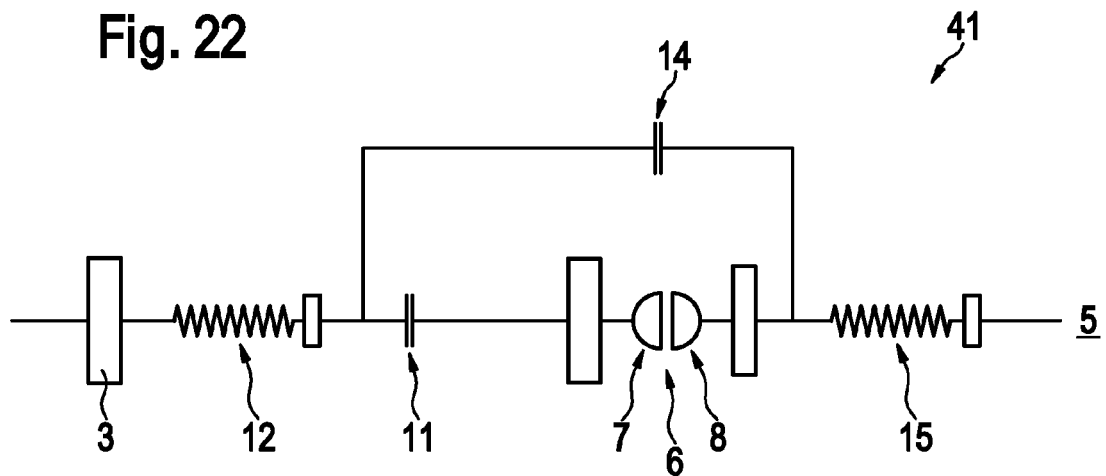

For the embodiment illustrated in FIG. 22 the pump clutch 11 and the torque converter 6 are connected in series. The converter lockup clutch 14 is connected in parallel to the series connection 11, 6. The pump damper 12 is connected in front of this parallel connection, which pump damper in turn is connected after the drive unit 3. The converter damper 15 is connected after this parallel connection.

Figure 23:
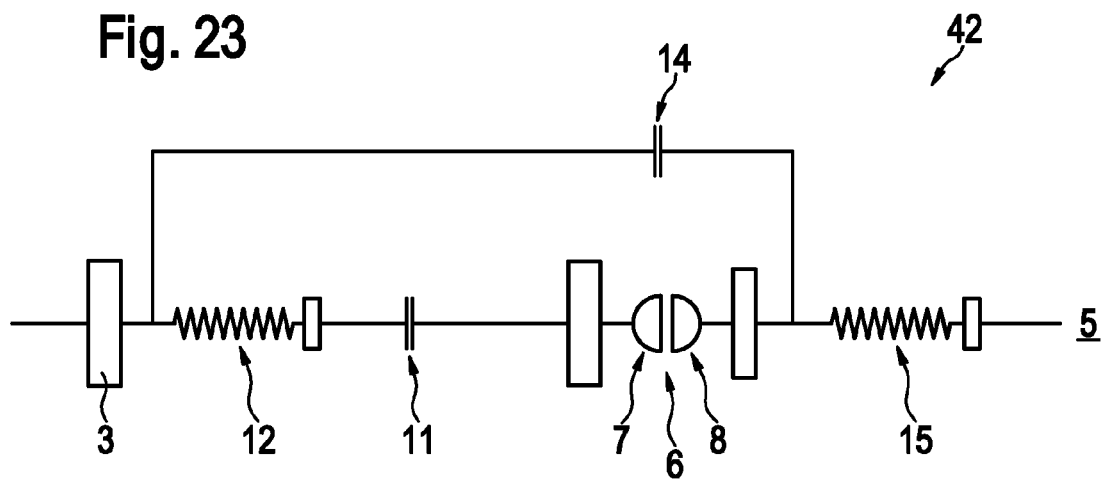

For the embodiment illustrated in FIG. 23 the pump damper 12, the pump clutch 11 and the torque converter 6 are connected in the force flow in series behind one another. The converter lockup clutch 14 is connected in parallel with the series connection 12, 11, 6. This parallel connection is connected after the drive unit 3. The converter damper 15 is connected after this parallel connection.

Figure 24:
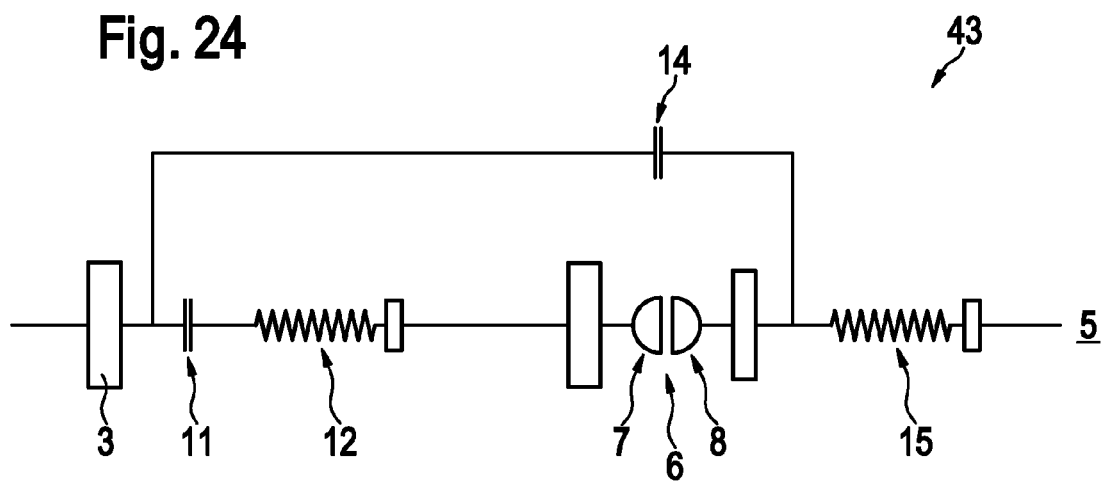

The embodiment illustrated in FIG. 24 is similar to the embodiment illustrated in FIG. 23. However, for the embodiment illustrated in FIG. 24 the pump damper 12 is connected after the pump clutch 11. For the embodiment illustrated in FIG. 23 the pump damper 12 is connected in front of the pump clutch 11. Otherwise the two embodiments are identical.

Figure 25:
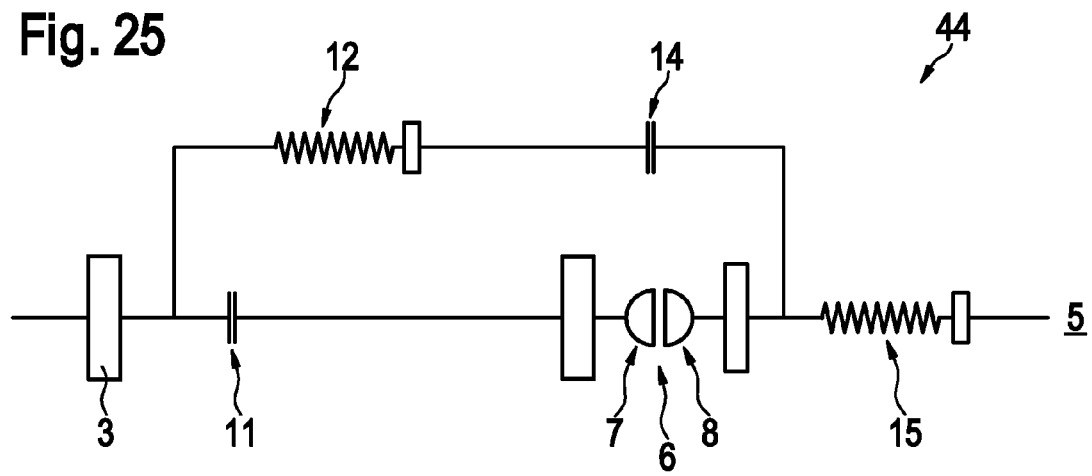

For the embodiment illustrated in FIG. 25, the pump clutch 11 and the torque converter 6 are connected in the force flow behind one another. A series connection of the pump damper 12 and the converter lockup clutch 14 is connected in parallel with the series connection 11, 6. Thus, the pump damper 12 is connected in front of the converter lockup clutch 14. The parallel connection is connected after the drive unit 3. The converter damper 15 is connected after the parallel connection.

Figure 26:
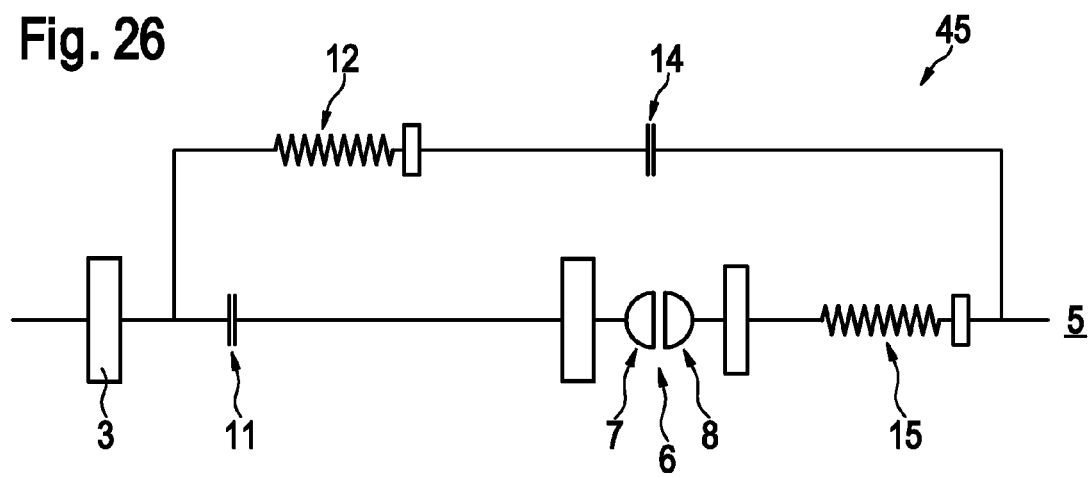

For the embodiment illustrated in FIG. 26 the pump clutch 11, the torque converter 6 and the converter damper 15 are connected in the force flow in series behind one another. A series connection of the pump damper 12 and the converter lockup clutch 14 is connected in parallel with the series connection 12, 6, 15. Thus, the pump damper 12 is connected in front of the converter lockup clutch 14. This parallel connection is connected after the drive unit 3.

Figure 27:
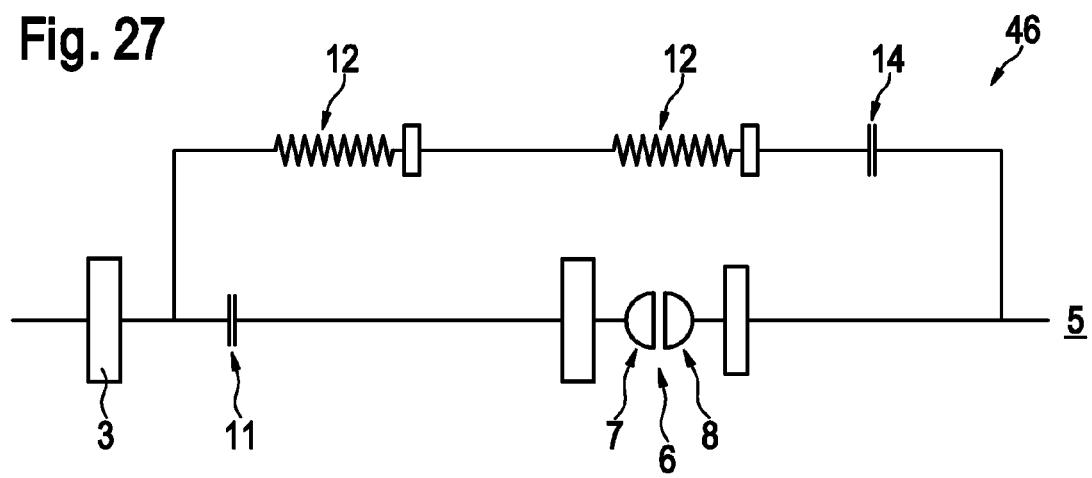

For the embodiment illustrated in FIG. 27 the pump clutch 11 and the torque converter 6 are connected in the force flow in series behind one another. In another series connection the pump damper 12, the converter damper 15, and the converter lockup clutch are connected in the force flow in series behind one another. The series connection 12, 15, 14 is connected in parallel with the series connection 11, 6. The drive unit 3 is connected in front of this parallel connection.

Figure 28:
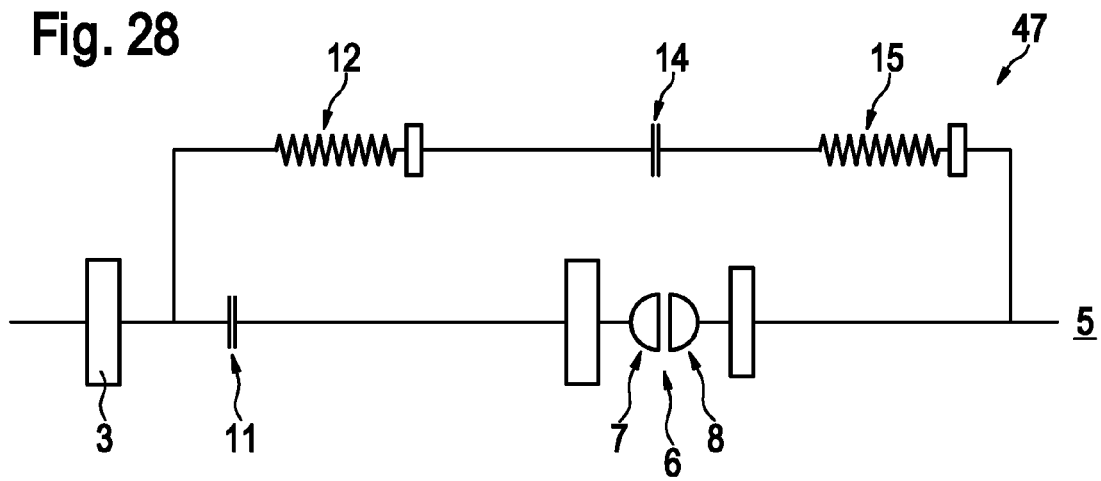

The embodiment illustrated in FIG. 28 is similar to the embodiment illustrated in FIG. 27. However, for the embodiment illustrated in FIG. 28, the converter lock up clutch 14 is connected in series between the pump damper 12 and the converter damper 15. Otherwise the two embodiments are identical.

Figure 29:
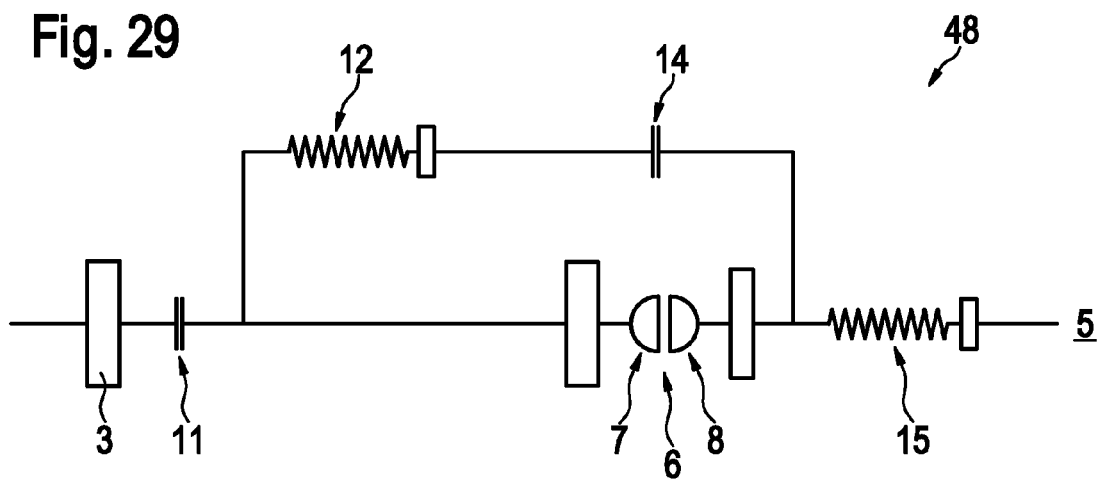

For the embodiment illustrated in FIG. 29 the pump damper 12 and the converter lockup clutch 14 are connected in the force flow in series behind one another. The torque converter 6 is connected in parallel with the series connection 12, 14. The pump clutch 11 is connected in front of this parallel connection which pump clutch in turn is connected after the drive unit 3. The converter damper 15 is connected after this parallel connection.

Figure 30:
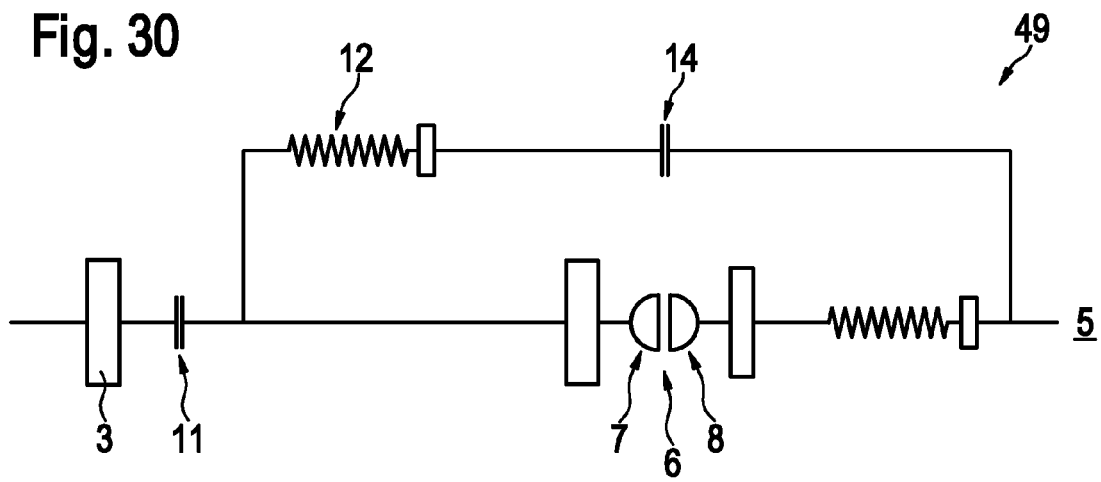

For the embodiment illustrated in FIG. 30 the torque converter 6 and the converter damper 15 are connected in the force flow in series behind one another. In another series connection the pump damper 12 and the converter lockup clutch 14 are connected in the force flow in series behind one another. The series connection 12, 14 is connected in parallel to the series connection 6, 15. The pump clutch 11 is connected in front of this series connection, which pump clutch is connected after the drive unit 3.

Figure 31:
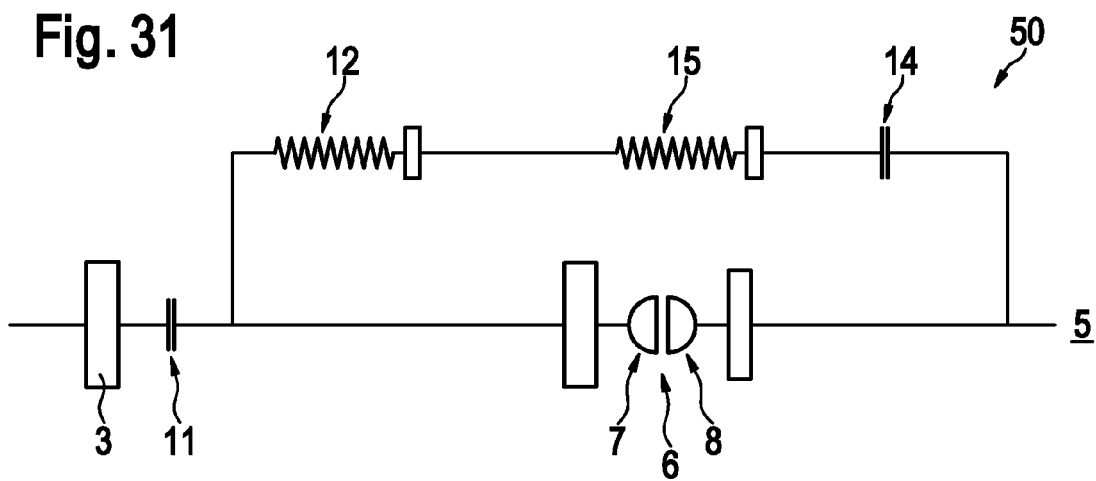

For the embodiment illustrated in FIG. 31, the pump damper 11, the converter damper 15 and the converter lockup clutch 14 are connected in the force flow in series behind one another. The torque converter 6 is connected in parallel with the series connection 12, 15, 14. The pump clutch 11 is connected in front of this parallel connection, which pump clutch in turn is connected after the drive unit 3.

Figure 32:
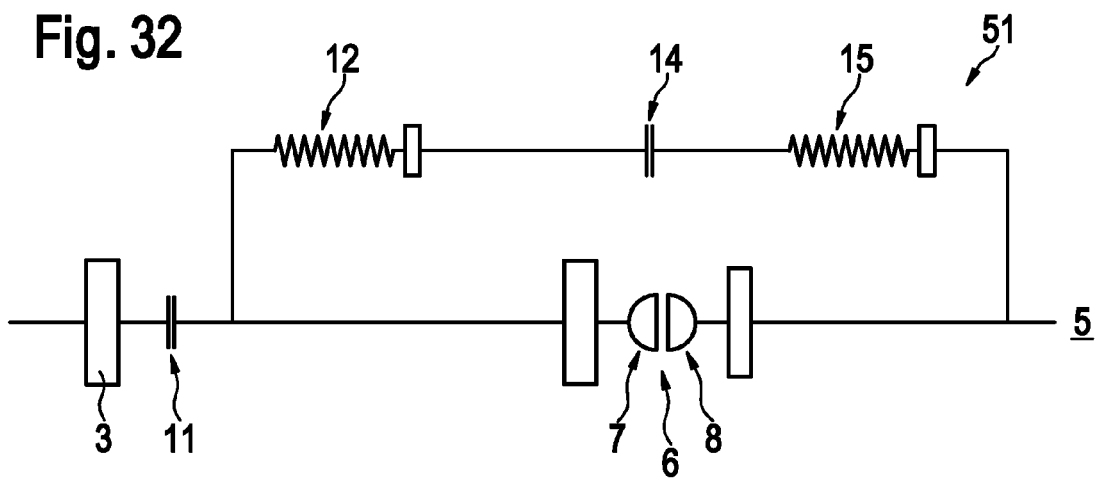

The embodiment illustrated in FIG. 32 is similar to the embodiment illustrated in FIG. 31. However, for the embodiment illustrated in FIG. 32 the converter lockup clutch 14 is connected in series between the pump damper 12 and the converter damper 15. Otherwise, the two embodiments are identical.

Figure 33:
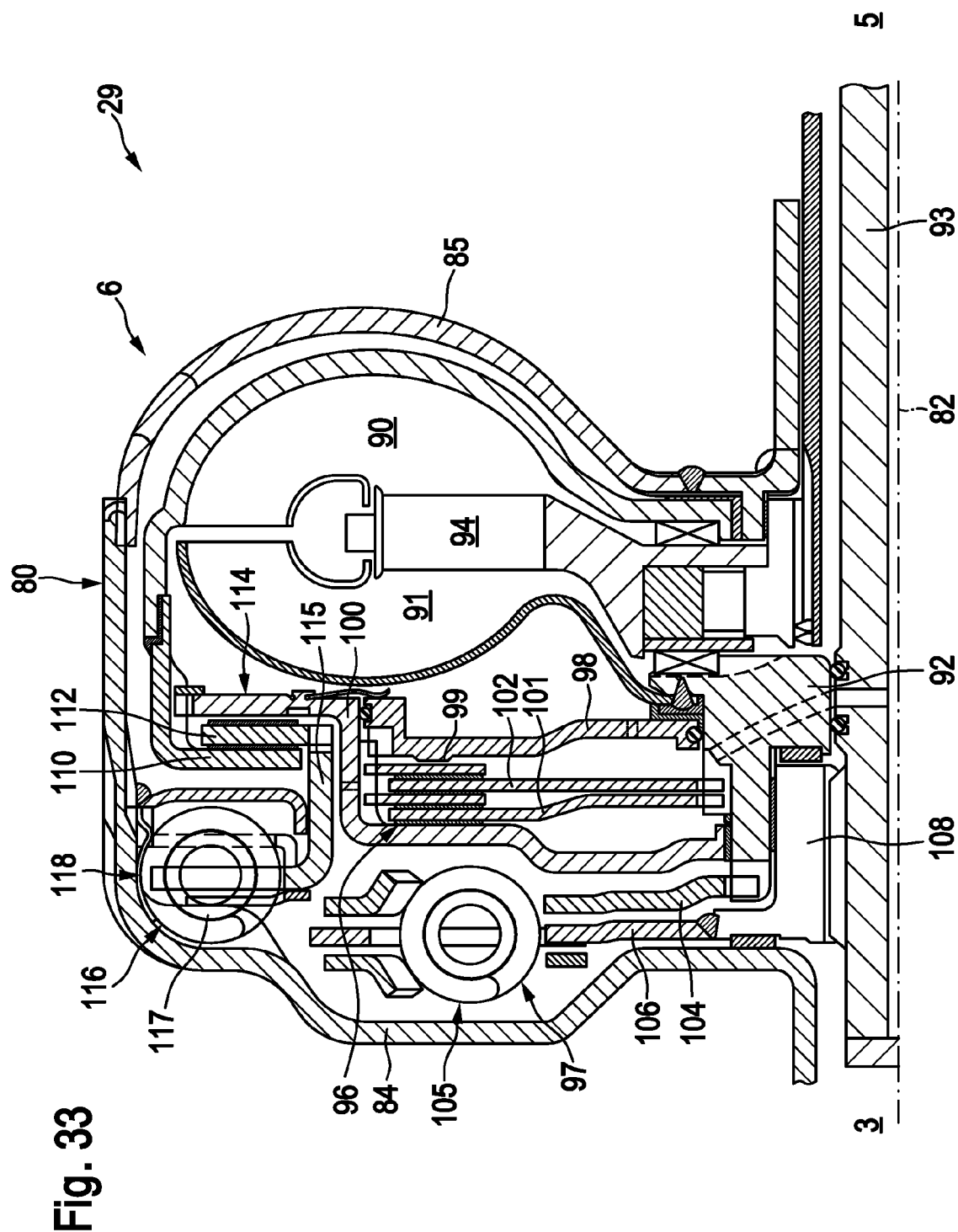
FIG. 33 illustrates a particular embodiment for the force flow diagram illustrated in FIG. 10.

FIG. 33 illustrates a detailed embodiment of the drive train 29 in a semi sectional view which is illustrated in FIG. 10 in a highly simplified manner. Between a drive unit 3, in particular a combustion engine from which a crank shaft extends, and a transmission 5, a hydrodynamic torque converter 6 is disposed. The crank shaft of the combustion engine 3 is connected e.g. through a drive plate which is not shown and which is configured as a flex plate torque proof with a housing 80 of the torque converter 6.

The housing 80 of the torque converter 6 is rotatable about a rotation axis 82 and configured with a housing wall 84 proximal to the drive and with a housing wall 85 distal from the drive. The proximal housing wall 84 is also designated as converter cover. The distal housing wall 85 is configured separately as a pump shell 90 which is designated 7 in the simplified illustration of FIG. 10.

Between the pump shell 90 and the proximal housing wall 84 a turbine shell 91 is disposed which is designated as 8 in FIG. 7. The turbine shell 91 is bonded to the turbine hub 92 through a weld. The turbine hub 92 is disposed rotatable relative to an input shaft 93 of the transmission 5. Between the turbine shell 91 and the pump shell 90 a stator shell is disposed in a known manner. A torque converter lock up clutch 96 with a torsion vibration damper 97 which is designated as 15 in FIG. 10 is disposed in a known manner between the turbine shell 91 and the housing wall 84 proximal to the drive. The torque converter lock up clutch 26 is designated as 14 in FIG. 10.

The torque converter lock up clutch comprises a piston 98 which is supported rotatable and axially moveable on the outside of the turbine shell hub 92. The piston 98 has a friction surface 99 on the radial outside which friction surface faces the internal combustion engine 3. Inner discs 101, 102 and outer discs can be clamped between the friction surface 99 and another friction surface which is provided axially offset from the friction surface 99 at an outer disc carrier 100. The inner discs 101, 102 are connected torque proof with the turbine shell hub 92. The outer discs which are not designated in more detail are connected torque proof to the outer disc support 100.

The inner discs 101, 102 are connected torque proof, with the turbine shell hub 92 connected there between, to an input component 104 of the damper 97 which is also designated as converter damper 97. The input component 104 is coupled in a known manner with energy accumulators 105 connected there between, in particular compression coil springs, to a damper flange or output component 106 of the torsion vibration damper 97. The damper flange 106 is bonded to a damper hub 108 through a weld. The damper hub 108 is in turn connected torque proof on the radial inside with one end of the input shaft 93 of the transmission 5.

The outer disc carrier 100 is connected torque proof on the radial outside with a support element 110 which is in turn bonded to the pump shell 90. The convertor lock up clutch 96 provides a mechanical connection between the pump shell 90 and the turbine shell 92 in closed condition through the outer disc carrier 100. The piston 98 of the converter lock up clutch 96 is actuated hydraulically. When the pressure of a hydraulic medium increases in a closure pressure cavity, the piston 98 moves in axial direction towards the outer disc support 100. The movement of the piston 98 clamps the friction discs in axial direction between the outer disc support 100 and the piston 98. The converter lock up clutch 96 is then closed.

Another friction disc 112 is associated with a pump clutch 114 which is designated as 11 in FIG. 10. The friction disc 112 is coupled to the housing 80 of the torque converter 6 through a pump damper 118 which is designated as 12 in FIG. 10. The pump damper 118 comprises an input component 117 which is permanently connected to the converter cover 84. The input component 117 is connected to an output component 115 of the pump damper 118 through energy accumulators 116 e.g. provided as compression coil springs. The output component 115 is in turn connected torque proof with friction disc 112.

The outer disc carrier 100 also forms the piston of the pump clutch 114 on the radial outside. When the outer disc carrier 100 is moved in axial direction towards the support element 110, the friction disc 112 disposed there between is clamped and the pump clutch 114 is closed. In closed state of the pump clutch 114 the pump shell 90 is coupled to the converter cover 84 through the pump damper 118.

Figure 34:
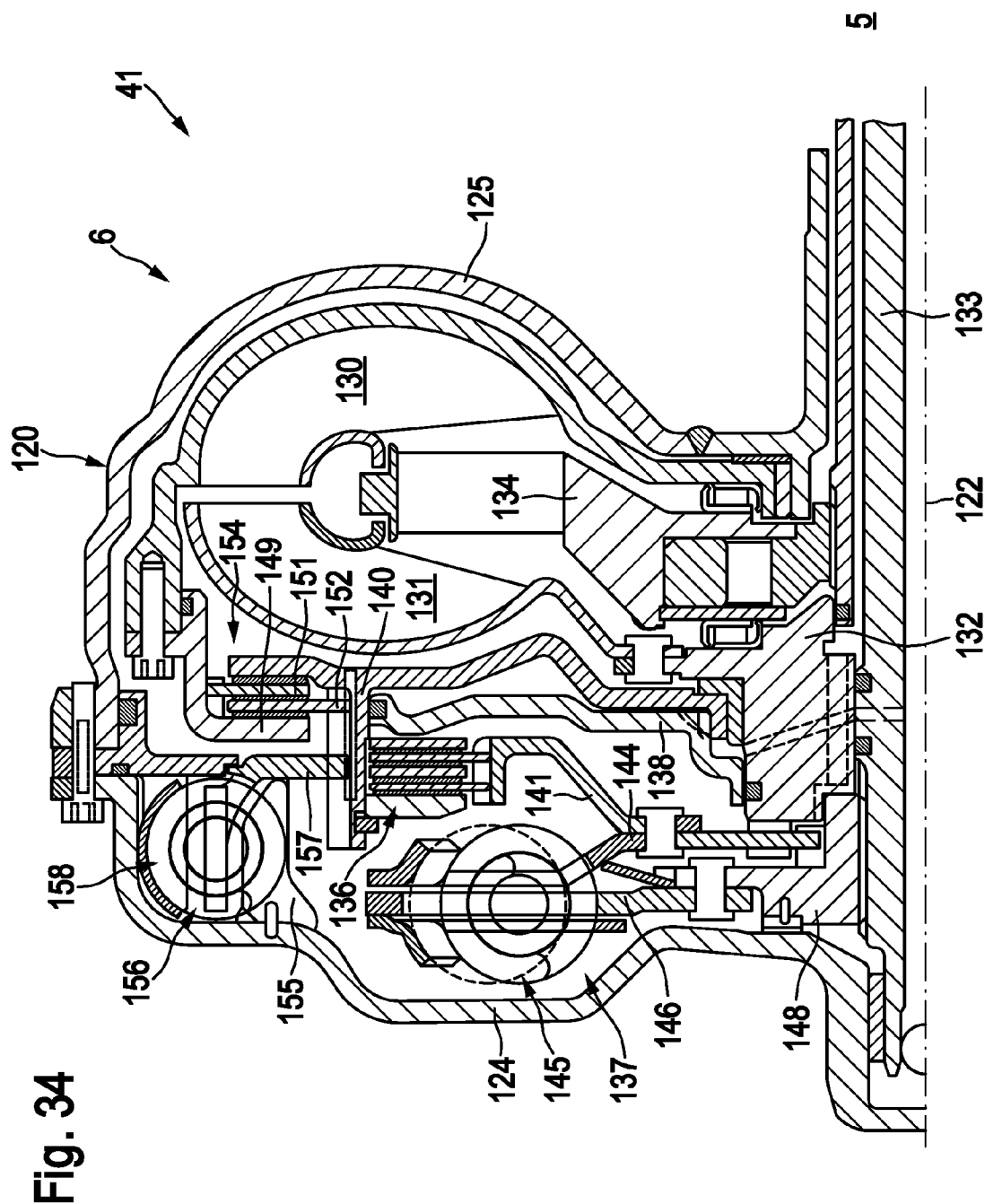
FIG. 34 illustrates a particular embodiment of the force flow diagram illustrated in FIG. 22.

In FIG. 34 the drive train 41 of FIG. 22 is shown is a semi sectional view for a particular embodiment. Between a drive unit 3, in particular an internal combustion engine, from which a crank shaft extends, and a transmission 5, a hydrodynamic torque converter 6 is disposed. The crank shaft of the internal combustion engine 3 is connected torque proof with a housing 120 of the torque converter 6. The housing 120 of the torque converter 6 is rotatable about a rotation axis 122 and provided with a housing wall 124 proximal to the drive and a housing wall 125 distal from the drive. The housing wall 124 proximal to the drive is also designated as converter cover. A pump shell 130 of the torque converter 6 is rotatably supported at the housing wall 125 distal from the drive.

Between the pump shell 130 and the housing wall 124 proximal to the drive a turbine shell 131 is disposed which is attached to a turbine hub 132 through rivet elements. The turbine shell hub 132 is disposed rotatable relative to an input shaft 133 of the transmission 5. Between the turbine shell 131 and the pump shell 130 a stator shell 134 is disposed in a known manner. Between the turbine shell 131 and the housing wall 124 proximal to the drive a converter lock up clutch 136 with a torsion vibration damper 137 is disposed. The converter lock up clutch 136 is designated as 14 in FIG. 22. The torsion vibration damper 137 which is also designated as converter damper is designated as 15 in FIG. 22.

The converter lock up clutch 136 is configured as a disc clutch and is hydraulically actuated through a piston 138. The disc clutch comprises outer discs which are mounted torque proof at an outer disc carrier 140. The disc clutch furthermore comprises inner discs which are mounted torque proof at an inner disc carrier 141. The inner disc carrier 141 is mounted torque proof through rivet connection elements with an input component 144 of the converter damper 137. The input component 144 is coupled through energy accumulators 145 with an output component 146 of the converter damper 137. The output component 146 is attached at a damper hub 148 through rivet connection elements which is in turn connected torque proof with the input shaft 133 of the transmission 5.

A support element 149 for friction discs 151, 152 of a pump clutch 154 is attached at the pump shell 130. The pump clutch 154 is designated as 11 in FIG. 22. A pump damper 158 is associated with the pump clutch 154, which pump damper is designated as 12 in FIG. 22. The pump damper 158 comprises an input component 155 which is permanently connected to the converter cover 124. The input component 155 is connected to an output component 157 of the pump damper 158 through energy accumulators 156. The output component 157 is in turn connected torque proof to the outer disc carrier 140. The outer disc carrier 140 simultaneously forms a piston through which the pump clutch 154 is hydraulically actuated.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS AND DESIGNATIONS

1 Drive Train
3 Drive Unit
5 Transmission
6 Torque Converter
7 Pump Shell
8 Turbine Shell
11 Pump Clutch
12 Pump damper
14 Converter lock up clutch
15 Converter damper
21-51 Drive train
80 Housing
82 Rotation Axis
84 Housing wall proximal to drive
85 Housing wall distal from drive
90 Pump shell
91 Turbine shell
92 Turbine shell hub
93 Input shaft
94 Stator shell
96 Converter lock up clutch
97 Torsion vibration damper
98 Piston
99 Friction surface
100 Outer disc carrier
101 Inner disc
102 Inner disc
104 Input component
105 Energy accumulators
106 Output component
108 Damper hub
110 Support element
112 Friction disc
114 Pump clutch
115 Output component
116 Energy accumulators
117 Output component
118 Pump damper
120 Housing
122 Rotation Axis
124 Housing wall proximal to drive
125 Housing wall distal from drive
130 Pump shell
131 Turbine shell
132 Turbine shell hub
133 Input shaft
134 Stator shell
136 Converter lock up clutch
137 Torsion vibration damper
138 Piston
140 Outer disc carrier
141 Inner disc carrier
144 Input component
145 Energy accumulators
146 Output component
148 Damper hub
149 Support element
151 Friction disc
152 Friction disc
154 Pump clutch
155 Input component
156 Energy accumulators
157 Output component
158 Pump damper

What is claimed is:
1. A torque transmission device comprising a torque converter disposed in a drive train of a motor vehicle, wherein the torque converter comprises:
a turbine shell;
a pump shell;

a pump clutch with an input and an output;

at least one pump damper with an input directly connected to a converter cover and an output directly connected to the input of the pump clutch;

at least one converter damper with:
   an output; and
   an input directly connected to the output of the pump clutch; and, at least one converter lock up clutch with an input directly connected to the output of the at least one converter damper, wherein when the pump clutch is closed and the at least one converter lock up clutch is open:
   a torque path passes through in sequence, the cover, the pump damper, the pump clutch, the pump shell and the turbine shell; and,
   the torque path does not pass through the at least one converter damper.

2. A torque transmission device according to claim 1, wherein the pump clutch can be connected or is connected between the converter cover and the converter damper.

3. A torque transmission device according to claim 1, wherein the converter damper is connected in front of the converter lock up clutch.

4. A torque transmission device according to claim 1, wherein the converter damper can be connected or is connected in series with the pump damper.

5. A torque transmission device according to claim 1, wherein the pump shell and the turbine shell can be connected or is connected in series with the pump damper and the pump clutch.

6. A torque transmission device according to claim 1, wherein the pump shell and the turbine shell can be connected or is connected parallel to the converter damper and the converter lock up clutch.

7. A torque transmission device according to claim 1, wherein the pump clutch and the converter lock up clutch can be connected or are connected in series.

8. A torque transmission device according to claim 1, wherein the converter lock up clutch and the converter damper can be connected or is connected in series with the pump damper.

9. A torque transmission device according to claim 1, wherein the converter damper can be connected or is connected between the pump damper and the converter lock up clutch.

10. A torque transmission device according to claim 1, wherein the torque converter comprises a stator shell.

11. A torque transmission device according to claim 1, wherein the pump shell and the turbine shell can be connected or is connected in series with the pump damper or the pump clutch.

12. A torque transmission device according to claim 1, wherein the pump shell and the turbine shell can be connected or is connected parallel to the converter damper or the converter lock up clutch.

13. A torque transmission device according to claim 1, wherein the converter lock up clutch or the converter damper can be connected or is connected in series with the pump damper.

* * * * *